(12) United States Patent
Hao et al.

(10) Patent No.: US 11,594,918 B2
(45) Date of Patent: Feb. 28, 2023

(54) WIRELESS CHARGING TRANSMITTER SYSTEM AND METHOD FOR CONTROLLING SAME

(71) Applicant: Halo Microelectronics Co., Ltd., Foshan (CN)

(72) Inventors: Yueguo Hao, Foshan (CN); Songnan Yang, Frisco, TX (US)

(73) Assignee: Halo Microelectronics Co., Ltd., Foshan (CN)

( * ) Notice: Subject to any disclaimer, the term of this patent is extended or adjusted under 35 U.S.C. 154(b) by 12 days.

(21) Appl. No.: 17/520,240

(22) Filed: Nov. 5, 2021

(65) Prior Publication Data

US 2022/0149662 A1    May 12, 2022

(30) Foreign Application Priority Data

Nov. 6, 2020 (CN) .......................... 202011226524.4

(51) Int. Cl.
*H02J 50/12* (2016.01)
*H02J 50/40* (2016.01)
*H02J 7/00* (2006.01)

(52) U.S. Cl.
CPC .............. *H02J 50/12* (2016.02); *H02J 7/007* (2013.01); *H02J 50/402* (2020.01)

(58) Field of Classification Search
None
See application file for complete search history.

(56) References Cited

FOREIGN PATENT DOCUMENTS

| CN | 110445265 A | 11/2019 |
|----|-------------|---------|
| CN | 110943551 A | 3/2020 |
| CN | 111740512 A | 10/2020 |

*Primary Examiner* — Adi Amrany
(74) *Attorney, Agent, or Firm* — Slater Matsil, LLP

(57) ABSTRACT

The present disclosure relates to a wireless charging transmitter system and its control method. The system includes at least two transmit coils, configured to simultaneously transmit power; at least two transmit circuits, wherein each of the transmit circuits is electrically connected to each of the transmit coils, and is configured to supply a current to the transmit coil; and at least one decoupling circuit, wherein the decoupling circuit is connected to any two coupled transmit coils of the at least two transmit coils. By controlling N switches in a first compensation circuit and/or M switches in a second compensation circuit in the decoupling circuit, compensation capacitors connected in parallel with two terminals of a first inductor and a second inductor are controlled such that the equivalent mutual-inductance of the decoupling circuit may be adjusted to improve decoupling precision and reduce power loss caused by coupling between transmit coils.

18 Claims, 15 Drawing Sheets

```
┌─────────────────────────────────────────────────────────────────┐ ─ S81
│ Controlling the first transmit circuit to generate an excitation current, such │
│ that an induction magnetic field is generated by the first transmit coil       │
└─────────────────────────────────────────────────────────────────┘
                                  │
┌─────────────────────────────────────────────────────────────────┐ ─ S82
│ Acquiring an induced circuit parameters at an output terminal of the │
│                    second transmit circuit                          │
└─────────────────────────────────────────────────────────────────┘
                                  │
┌─────────────────────────────────────────────────────────────────┐ ─ S83
│ Determining whether the induced circuit parameters satisfy predetermined │
│                        threshold conditions                            │
└─────────────────────────────────────────────────────────────────┘
                                  │
┌─────────────────────────────────────────────────────────────────┐
│ In response to determining that the induced circuit parameters do not │
│ satisfy the predetermined threshold conditions, control the N switches in │ ─ S84
│   the first compensation circuit and/or the M switches in the second   │
│ compensation circuit to operate in an on state or an off state, such that the │
│   induced circuit parameters at the output terminal of the transmit circuit  │
│               satisfy the predetermined threshold conditions              │
└─────────────────────────────────────────────────────────────────┘
```

FIG.8a

WIRELESS CHARGING TRANSMITTER SYSTEM AND METHOD FOR CONTROLLING SAME

PRIORITY CLAIM

This application claims the benefit of and priority to Chinese Patent Application No. 202011226524.4, filed on Nov. 6, 2020, which is hereby incorporated by reference in its entirety.

TECHNICAL FIELD

Embodiments of the present disclosure relate to the technical field of wireless charging, and in particular, relates to a wireless charging transmitter system and a method for controlling the same.

BACKGROUND

Due to safety and convenience, wireless power transfer technology is being widely applied to various electronic devices, for example, smart phones, medical equipment, electric automotive and the like. Smart terminals in particular, in recent years, with developments of the smart phones, the wireless charging function is gradually becoming a standard function configuration on high-end mobile phones. The state of the art wireless charging transmitter system supports wireless power transfer for mobile phones in any posture in a three-dimensional space. To achieve the wireless power transfer in any posture in the three-dimensional space, the transmitter needs to generate magnetic fields in multiple orientations to accommodate various possible distances and postures of the receive coil.

However, when a plurality of transmit coils operate collaboratively, due to strong coupling between the transmit coils, especially, in the scenario where metals exist in the external application environment, coupling between the transmit coils may be significantly changed. In the case that coupling between the transmit coils is strengthened, power loss of the transmitter system may be significantly increased.

SUMMARY

In a first aspect, embodiments of the present disclosure provide a wireless charging transmitter system. The wireless charging transmitter system includes: at least two transmit coils, configured to simultaneously transmit power; at least two transmit circuits, wherein each of the transmit circuits is electrically connected to each of the transmit coils, and configured to supply a current to the transmit coil; and at least one decoupling circuit, wherein the decoupling circuit is connected to any two coupled transmit coils of the at least two transmit coils. The decoupling circuit includes a first inductor, a second inductor, a first capacitor, and a second capacitor, wherein the first inductor and the first capacitor form a first parallel circuit, the second inductor and the second capacitor form a second parallel circuit, the first inductor and the second inductor are wound about the same magnetic core or air core, and a first terminal of the first inductor and a first terminal or second terminal of the second inductor are dotted terminals.

In some embodiments, the any two coupled transmit coils include a first transmit coil and a second transmit coil; and the decoupling circuit further include a third inductor, a fourth inductor, a third capacitor, and a fourth capacitor, wherein the third inductor and the third capacitor are connected in parallel with form a third parallel circuit, the fourth inductor and the fourth capacitor are connected in parallel with form a fourth parallel circuit, the third inductor and the fourth inductor are wound about the same magnetic core or air core with the first inductor and the second inductor, and a first terminal of the third inductor and a first terminal or second terminal of the fourth inductor are dotted terminals; wherein the first parallel circuit and the third parallel circuit are connected to the two terminals of the first transmit coil respectively, and the second parallel circuit and the fourth parallel circuit are connected to the two terminals of the second transmit coil respectively.

In some embodiments, the decoupling circuit further includes a fifth capacitor and a sixth capacitor; wherein the fifth capacitor and the first parallel circuit are connected in series; and the sixth capacitor and the second parallel circuit are connected in series.

In a second aspect, embodiments of the present disclosure provide a wireless charging transmitter system. The wireless charging transmitter system includes: at least two transmit coils, configured to simultaneously transmit power to a receive coil; at least two transmit circuits, wherein each of the transmit circuits is electrically connected to each of the transmit coils, and configured to supply a current to the transmit coil; at least one decoupling circuit, wherein the decoupling circuit is connected to any two coupled transmit coils of the at least two transmit coils, and the decoupling circuit includes a first inductor, a second inductor, a first capacitor, a second capacitor, a first compensation circuit, and a second compensation circuit; wherein the first inductor and the first capacitor form a first parallel circuit, the second inductor and the second capacitor form a second parallel circuit, the first compensation circuit is connected in parallel with the first parallel circuit, and the second compensation circuit is connected in parallel with the second parallel circuit; the first inductor and the second inductor are wound about the same magnetic core or air core, and a first terminal of the first inductor and a first terminal or a second terminal of the second inductor are dotted terminals; and the first compensation circuit includes N groups of first series circuits each formed by a compensation capacitor and a switch, the N groups of first series circuits are connected in parallel, and the second compensation circuit includes M groups of second series circuits each formed by a compensation capacitor and a switch, the M groups of second series circuits are connected in parallel, and M and N are positive integers and M+N is greater than 1; and a control circuit, wherein the control circuit is electrically connected to the decoupling circuit and the transmit circuits, and is configured to control the N switches in the first compensation circuit and/or the M switches in the second compensation circuit to operate in an on state or an off state, such that the induced circuit parameters at output terminals of the transmit circuits satisfy predetermined threshold conditions.

In some embodiments, capacitances of the N compensation capacitors in the first compensation circuit are defined at a ratio of $2^{N-1}$; and capacitances of the M compensation capacitors in the second compensation circuit are defined at a ratio of $2^{M-1}$.

In some embodiments, the system further includes at least two tuning circuits, wherein the tuning circuits are electrically connected to the transmit coils respectively and configured to dynamically tune the transmit coils.

In some embodiments, the tuning circuits include P tuning capacitors that are arranged in series, and tuning switches are connected in parallel with any P−1 tuning capacitors of the P tuning capacitors, wherein the tuning switches are configured to control the tuning capacitors connected in parallel thereto to be in an operating state or a short-circuit state, wherein P is an integer greater than or equal to 2.

In some embodiments, any two coupled inductors in the decoupling circuit are coaxial.

In a third aspect, embodiments of the present disclosure provide a method for controlling a wireless charging transmitter system, applicable to the wireless charging transmitter system as described above, wherein the at least two transmit coils include a first transmit coil and a second transmit coil, and the at least two transmit circuits include a first transmit circuit and a second transmit circuit, the first transmit circuit being electrically connected to the first transmit coil, the second transmit circuit being electrically connected to the second transmit coil, the first inductor being connected to the first transmit coil, and the second inductor being connected to the second transmit coil. The method includes: controlling the first transmit circuit to generate an excitation current, such that an induction magnetic field is generated by the first transmit coil; acquiring induced circuit parameters at an output terminal of the second transmit circuit; determining whether the induced circuit parameters satisfy predetermined threshold conditions; in response to determining that the induced circuit parameters do not satisfy the predetermined threshold conditions, controlling the N switches in the first compensation circuit and/or the M switches in the second compensation circuit to operate in an on state or an off state, such that the induced circuit parameters satisfy the predetermined threshold conditions.

In some embodiments, the induced circuit parameters include an induced voltage and an induced current; the induced circuit parameters satisfy the following predetermined threshold conditions: the induced voltage is less than or equal to a predetermined voltage threshold, and the induced current is less than or equal to a predetermined current threshold.

In some embodiments, the system further includes a tuning circuit, wherein the tuning circuit is electrically connected to the transmit circuits, the transmit coils, and the control circuit; and the method further includes: adjusting a parameter of the tuning circuit based on input impedances of equivalent loads of the transmit circuits to dynamically tune the transmit coils.

BRIEF DESCRIPTION OF THE DRAWINGS

One or more embodiments are illustrated by way of example, and not by limitation, in the figures of the accompanying drawings, wherein elements/modules and steps having the same reference numeral designations represent like elements/modules and steps throughout. The drawings are not to scale, unless otherwise disclosed.

FIG. 8a is a schematic flowchart of a method for controlling a wireless charging transmitter according to an embodiment of the present disclosure;

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

Figure 1:
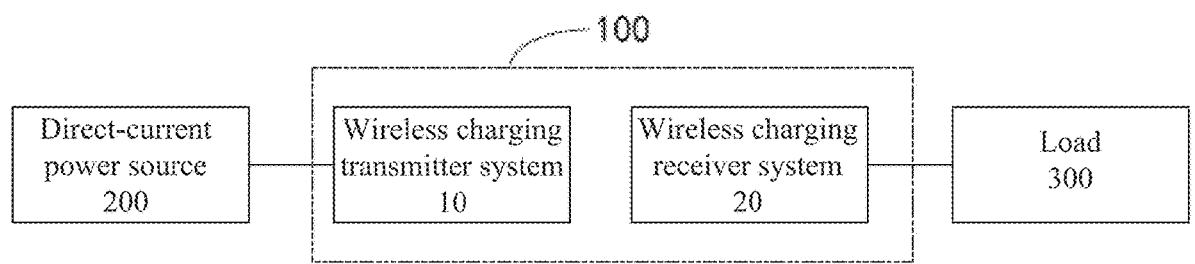
FIG. 1 is a schematic diagram of an application scenario of a wireless charging transmitter system according to an embodiment of the present disclosure.

The present disclosure is further described with reference to some exemplary embodiments. The embodiments hereinafter facilitate further understanding of the present disclosure for a person skilled in the art, rather than causing any limitation to the present disclosure. It should be noted that persons of ordinary skill in the art may derive various variations and modifications without departing from the inventive concept of the present disclosure. Such variations and modifications shall pertain to the protection scope of the present disclosure.

For clearer descriptions of the objectives, technical solutions, and advantages of the embodiments of the present disclosure, the following clearly and completely describes the technical solutions in the embodiments of the present disclosure with reference to the accompanying drawings in the embodiments of the present disclosure. Apparently, the described embodiments are merely a part rather than all of the embodiments of the present disclosure. Based on the embodiments of the present disclosure, all other embodiments derived by persons of ordinary skill in the art without any creative efforts shall fall within the protection scope of the present disclosure.

It should be noted that, in the absence of conflict, features in the embodiments of the present disclosure may be incorporated, which all fall within the protection scope of the present disclosure. In addition, although logic function module division is illustrated in the schematic diagrams of apparatuses, and logic sequences are illustrated in the flowcharts, in some occasions, steps illustrated or described by using modules different from the module division in the apparatuses or in sequences different from those illustrated. Further, the terms "first," "second," and "third" used in this text do not limit data and execution sequences, and are intended to distinguish identical items or similar items having substantially the same functions and effects.

One or more embodiments are illustrated by way of example, and not by limitation, in the accompanying drawings, wherein components having the same reference numeral designations represent like components throughout. The drawings are not to scale, unless otherwise disclosed.

Referring to FIG. 1, FIG. 1 is a schematic diagram of an application scenario of a wireless charging transmitter system 10 according to an embodiment of the present disclosure. As illustrated in FIG. 1, the wireless charging transmitter system 10 is applicable to a wireless charging system 100. The wireless charging system 100 includes the wireless charging transmitter system 10 and a wireless charging receiver system 20. The wireless charging receiver system 20 may be configured in a smart terminal. The smart terminal may be any suitable type of smart terminal configured to establish coupling with the wireless charging transmitter system 10, such as, a mobile phone, a tablet computer, a smart watch, or a smart remote control. The wireless charging transmitter system 10 may be configured in a charging base, a desktop, or the like apparatus. The wireless charging transmitter system 10 is further electrically connected to a direct-current power source 200. The direct-current power source 200 supplies power to the wireless charging transmitter system 10. The direct-current power source 200 may be a power source obtained by rectification of a mains power by a rectifier circuit. The wireless charging receiver system 20 is further electrically connected to a load 300, and is configured to charge the load 300. Under normal circumstances, the load 300 is a battery. When the battery of a smart terminal needs to be charged, the wireless charging transmitter system 10 conducts a series of conversions on power supplied by the direct-current power source 200, and transmits the converted power by a transmit coil thereof. The transmit coils are coupled to the receive coil in the wireless charging receiver system 20. The transmit coils transmit power to the receive coil, and the receive coil receives the power. An internal circuit of the wireless charging receiver system 20 correspondingly processes the power to charge the load 300. In the traditional technologies, highly efficient wireless transmission of the power may be achieved only when the transmit coils are tightly attached to and coupled to the receive coil. In addition, a slightly greater charging range is not supported, or diversified charging postures (for example, vertically standing, horizontally placement, a spatial posture held when a user is in interaction with a smart terminal, or the like) of the smart terminal are not supported.

Figure 2A:
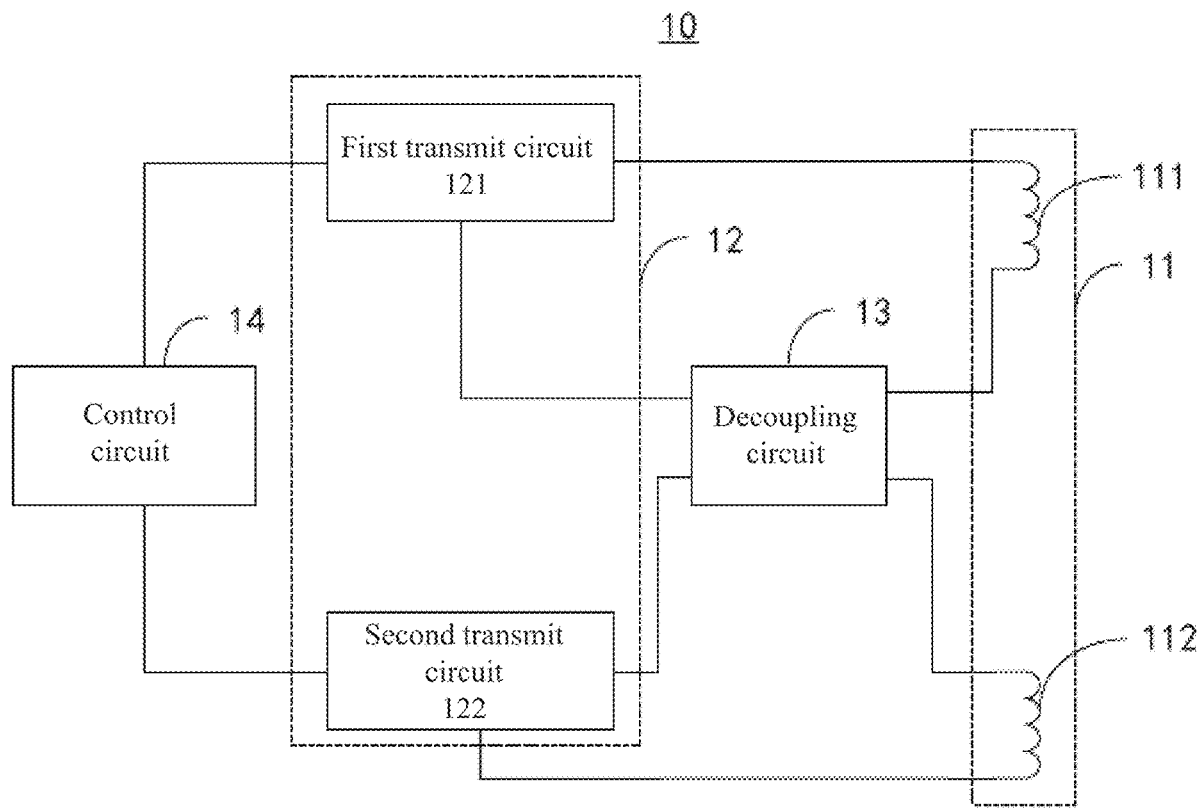
FIG. 2a is a schematic structural diagram of a wireless charging transmitter system according to an embodiment of the present disclosure.

Referring to FIG. 2a, FIG. 2a illustrates a wireless charging transmitter system 10 according to an embodiment of the present disclosure. The wireless charging transmitter system 10 includes at least two transmit coils 11, at least two transmit circuits 12, a decoupling circuit 13, and a control circuit 14. FIG. 2a illustrates two transmit coils and two transmit circuits as an example. The at least two transmit coils 11 include a first transmit coil 111 and a second transmit coil 112. The at least two transmit circuits 12 include a first transmit circuit 121 and a second transmit circuit 122. The first transmit circuit 121 is electrically connected to the first transmit coil 111. The second transmit circuit 122 is electrically connected to the second transmit coil 112. The transmit circuit 12 is configured to supply a current to a corresponding transmit coil 11. An inductive coupling is present between the first transmit coil 111 and the second transmit coil 112, and a mutual-inductance between the two coils is M. Specifically, in accordance with a structure and a relative spatial positional relationship between the coils, a first terminal (an input terminal) of the first transmit coil 111 and a first terminal (an input terminal) or a second terminal (an output terminal) of the second transmit coil 112 may be dotted terminals. It should be noted that, in this embodiment and the various embodiments of the present disclosure hereinafter, the embodiments are described given using a case where the first terminal (the input terminal) of the first transmit coil 111 and the first terminal (the input terminal) of the second transmit coil 112 are configured as the dotted terminals.

In this embodiment, the at least two transmit circuits 12 are further connected to a direct-current power source 200. The direct-current power source 200 supplies direct-current power to the first transmit circuit 121 and the second transmit circuit 122. The first transmit circuit 121 and the second transmit circuit 122 both convert the direct-current power into an alternating current, and then supply the alternating current to their corresponding transmit coils 11.

The decoupling circuit 13 is connected to the first transmit coil 111, the second transmit coil 112, the first transmit circuit 121, and the second transmit circuit 122, and is configured to generate, based on an induced electromotive force generated in the first transmit coil 111 or the second transmit coil 112 due to spatial coupling, an induced electromotive force with opposite direction to the induced electromotive force from spatial coupling. In this way, power loss of a wireless charger transmitter is reduced.

The decoupling circuit 13 may be connected in the wireless charging transmitter system 10 in different ways. In some embodiments, continue referring to FIG. 2a, the decoupling circuit 13 is connected to an output terminal of the first transmit coil 111, an input terminal of the first transmit circuit 121, an output terminal of the second transmit circuit 122, and the input terminal of the second transmit coil 112. In other embodiments, referring to FIG. 2b, the decoupling circuit 13 is connected to the output terminal of the first transmit coil 111, the input terminal of the first transmit circuit 121, the output terminal of the second transmit coil 112, and the input terminal of the second transmit circuit 122.

It may be understood that the decoupling circuit 13 is configured to offset the induced electromotive force generated in the transmit coils due to spatial coupling. In some embodiments, referring to FIG. 3a, the decoupling circuit includes a first inductor $Ld_1$, a second inductor $Ld_2$, a first capacitor $Cd_1$, and a second capacitor $Cd_2$. The first inductor $Ld_1$ is connected in parallel with the first capacitor $Cd_1$ to form a first parallel circuit 131. The second inductor $Ld_2$ is connected in parallel with the second capacitor $Cd_2$ to form a second parallel circuit 132. The first inductor $Ld_1$ and the second $Ld_2$ are wound about the same magnetic core or air core. A coupling coefficient between the two inductors is kd. A first terminal of the first inductor $Ld_1$ and a first terminal or a second terminal of the second inductor $Ld_2$ are dotted terminals.

Figure 2B:
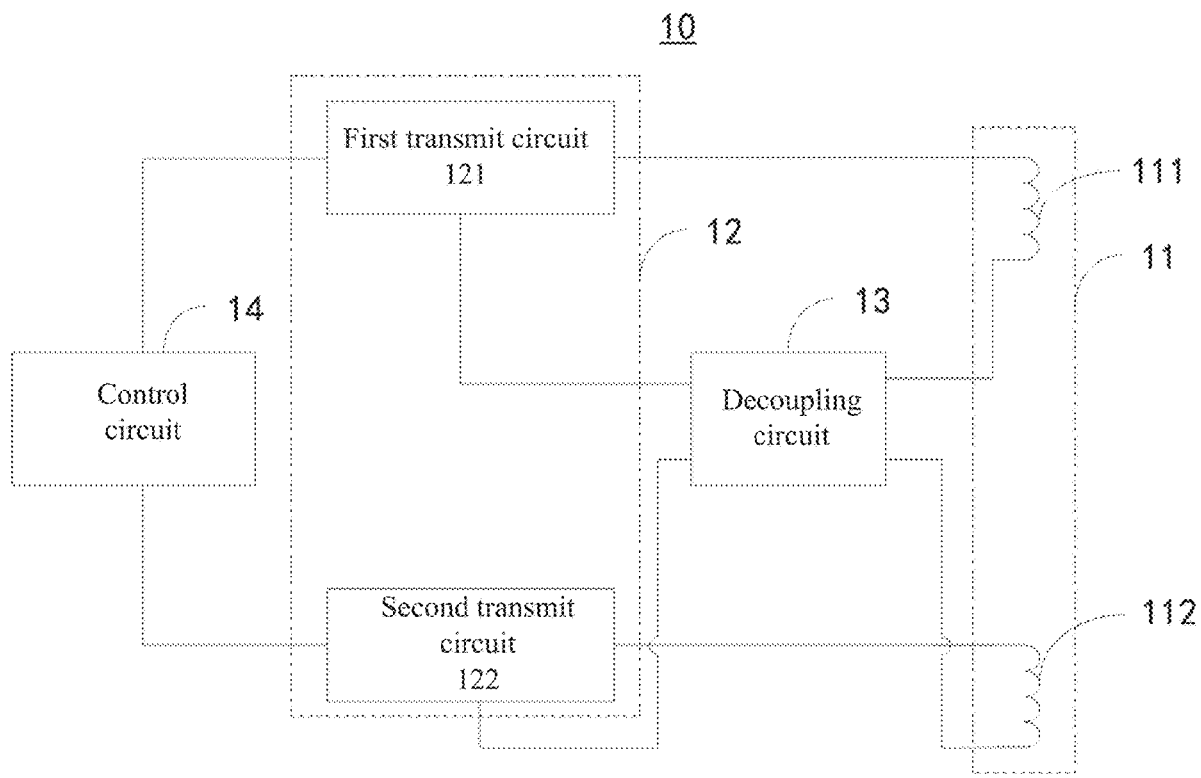
FIG. 2b is a schematic structural diagram of another wireless charging transmitter system according to an embodiment of the present disclosure.

It should be noted that configuration of the dotted terminals of the first inductor $Ld_1$ and the second inductor $Ld_2$ is related to a connection position of the decoupling circuit 13 in the wireless charging transmitter system 10. Where the connection position of the decoupling circuit 13 is as illustrated in FIG. 2a, the first terminal of the first inductor $Ld_1$ and the second terminal of the second inductor $Ld_2$ are dotted terminals. Where the connection position of the decoupling circuit 13 is as illustrated in FIG. 2b, the first terminal of the first inductor $Ld_1$ and the first terminal of the second inductor $Ld_2$ are dotted terminals. In this way, the dotted terminals of the first inductor $Ld_1$ and the second inductor $Ld_2$ are connected, such that an induced electromotive force VD1 generated in the first inductor $Ld_1$ due to coupling is opposite to an induced electromotive force VM1 generated in the first transmit coil 111 due to coupling; and likewise, an induced electromotive force VD2 generated in the second inductor $Ld_2$ due to coupling is opposite to an induced electromotive force VM2 generated in the second transmit coil 112 due to coupling. In this way, the induced electromotive force generated in the transmit coils due to spatial coupling is offset, and thus the power loss of the wireless charging transmitter is reduced. The first capacitor is connected in parallel with the first inductor, and the second capacitor is connected in parallel with the second inductor. A resonance frequency of the decoupling circuit is adjusted by the first capacitor and the second capacitor, such that an equivalent mutual-inductance of the decoupling circuit is adjusted, and decoupling precision of the decoupling circuit is improved.

Specifically, decoupling principles of the decoupling circuit may be described as follows.

Assuming that the control circuit controls the second transmit circuit 122 to generate an excitation current, then the second transmit coil 112 and the first transmit coil 111 form spatial coupling, and a coupling voltage VW is generated in the first transmit coil 111; and the same excitation current flows through the second inductor $Ld_2$, a coupling voltage $VD_1$ may be generated on the first inductor $Ld_1$, and based on the configuration of the dotted terminals of the decoupling circuit, $VM_1$ is opposite to $VD_1$; then a total induced voltage $V^{total}$ generated in the decoupling circuit and the transmit coils is: Vtotal=$VM_1$+$VD_1$=$IT_{x2}$*jω(M−Md), wherein $ITx_2$ represents an excitation current at the output terminal of the second transmit circuit, Md represents a mutual-inductance between the first inductor and the second inductor in the decoupling circuit, M represents a mutual-inductance between the first transmit coil and the second transmit coil, ω represents an angular frequency of the transmitter system, and j represents an imaginary unit.

In order to cause the total induced voltage Vtotal to converge to zero as much as possible, Md may be adjusted based on the mutual-inductance M between the coils. When M=Md, that is, $kd\sqrt{Ld_1 \cdot Ld_2} = k\sqrt{LT_{x1} \cdot LT_{x2}}$, the total induced voltage Vtotal is zero, wherein kd represents a coupling coefficient between the first inductor and the second inductor, $Ld_1$ and $Ld_2$ represent inductances of the first inductor and the second inductor respectively, k represents a coupling coefficient between the first transmit coil and the second transmit coil, and $LT_{x1}$ and $LT_{x2}$ represent inductances of the first transmit coil and the second transmit coil respectively. It may be understood that $LT_{x1}$ and $LT_{x1}$ are inherited characteristics of the transmit coils, and the coupling coefficient and the mutual-inductance between the transmit coils are determined according to the structure of the transmit coils and a surrounding environment thereof. Therefore, decoupling between the transmit coils may be only achieved by adjusting the mutual-inductance between the first inductor and the second inductor in the decoupling circuit. However, the mutual-inductance between the inductors for decoupling may only be adjusted by changing the number of turns of the coils one turn at a time. In this fashion, even in an application scenario where fixed coupling is present between the transmit coils, a granularity requirement for adjusting the mutual-inductance between the inductors for decoupling fails to be satisfied, such that it is hard to achieve sufficient decoupling of the transmit coils.

Figure 3A:
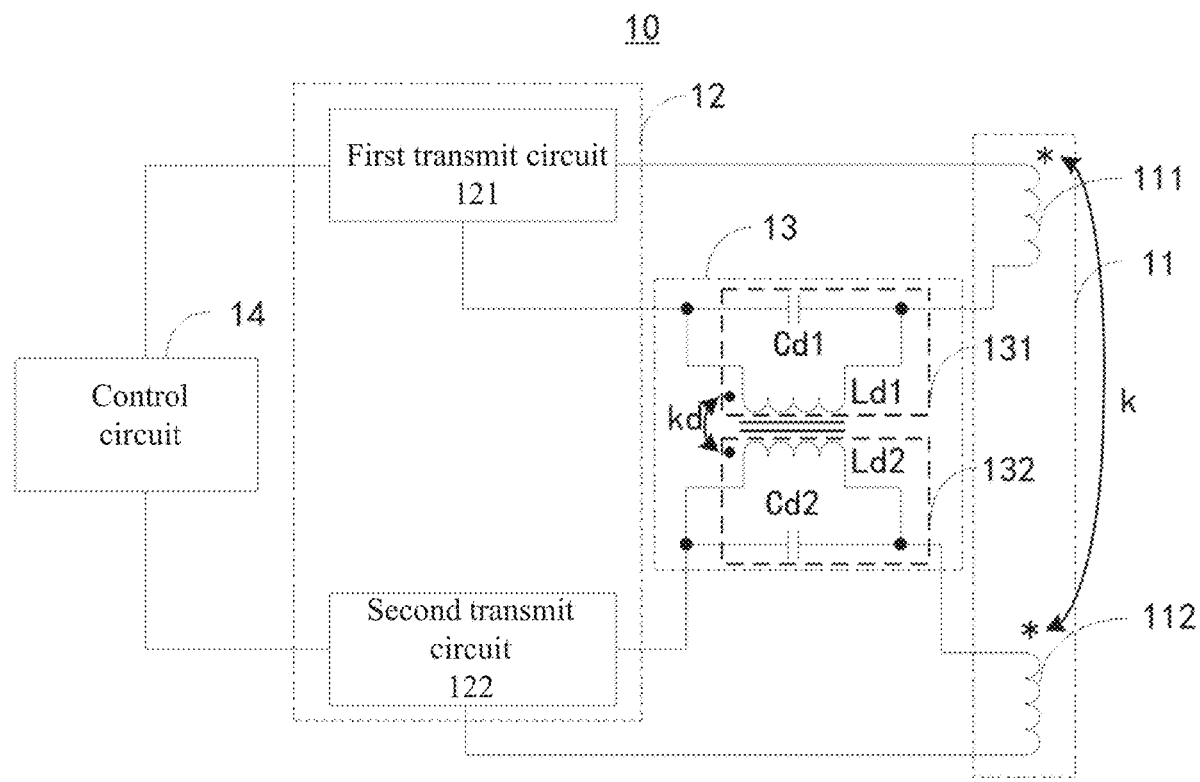
FIG. 3a is a schematic structural diagram of a wireless charging transmitter system according to an embodiment of the present disclosure.

Accordingly, in this embodiment, the mutual-inductance in the decoupling circuit is finely adjusted by connecting capacitors in parallel between two terminals of the inductors in the decoupling circuit. Referring to FIG. 3a, the first inductor $Ld_1$ is connected in parallel with the first capacitor $Cd_1$, the second inductor $Ld_2$ is connected in parallel with the second capacitor $Cd_2$. It may be understood that configuration of the parallel-connected capacitors does not change the coupling coefficient between the first inductor and the second inductor. However, the parallel-connected capacitors reduce a resonance frequency of the decoupling circuit, and hence improve an equivalent inductance and an equivalent mutual-inductance of the decoupling circuit. Specifically, an equivalent inductance $Ld_{1+}$ of the first inductor $Ld_1$ added with the first capacitor $Cd_1$ is: $Ld_{1-}=Ld_1/(1-\omega^2 Ld_1 Cd_1)$ and an equivalent inductance $Ld_{2+}$ of the second inductor $Ld_2$ added with the second capacitor $Cd_2$ is $Ld_{2+}=Ld_2/(1-\omega^2 Ld_2 Cd_2)$. In this case, M=Md, that is, Md=kd$\sqrt{Ld_{1+} \cdot Ld_{2+}}$. Accordingly, in the decoupling circuit, by the capacitors connected in parallel with the inductors, a mutual-inductance Md between the first inductor and the second inductor in the decoupling circuit may be finely adjusted.

The decoupling circuit 13 may be connected to an output terminal (as illustrated in FIG. 2a) or an input terminal (as illustrated in FIG. 2b) of the second transmit coil 112. In the case that the first transmit coil (for example, the first transmit coil 111) operates in a transmit state, since the decoupling circuit 13 is inductive at the system operating frequency, a corresponding voltage drop may be caused when a current flows through the decoupling circuit 13, such that the central point of potential between input and output ports of a corresponding transmit circuit (for example, the transmit circuit 121) is deviated from the center of wiring of the transmit coils. In this way, an average potential of the entire transmit coils is changed, and hence unnecessary coupling of electric field, electromagnetic interference and the like are caused. Accordingly, in some embodiments, referring to FIG. 3b, the decoupling circuit 13 further includes a third inductor $Ld_3$, a fourth inductor $Ld_4$, a third capacitor $Cd_3$, and a fourth capacitor $Cd_4$. The third inductor $Ld_3$ and the third capacitor $Cd_3$ form a third parallel circuit 133. The fourth inductor $Ld_4$ and the fourth capacitor $Cd_4$ form a fourth parallel circuit 134. The third inductor $Ld_3$ and the fourth inductor $Ld_4$ are wound about the same magnetic core or air core with the first inductor $Ld_1$ and the second inductor $Ld_2$. A first terminal of the third inductor $Ld_3$ and a first terminal or a second terminal of the fourth inductor $Ld_4$ are dotted terminals. The first parallel circuit 131 and the third parallel circuit 133 are connected to the two terminals of the first transmit coil 111 respectively. The second parallel circuit 132 and the fourth parallel circuit 134 are connected to the two terminals of the second transmit coil 112 respectively.

The induced electromotive force VD1 generated in the first parallel circuit 131 is consistent in terms of orientation with an induced electromotive force VD3 generated in the third parallel circuit 133, and the induced electromotive force VD2 generated in the second parallel circuit 132 is consistent in terms of orientation with an induced electromotive force generated in the fourth parallel circuit 134.

In this embodiment, in one aspect, the third inductor $Ld_3$ and the fourth inductor $Ld_4$ are wound about the same magnetic core or air core with the first inductor $Ld_1$ and the second inductor $Ld_2$, such that a coupling efficient between the first inductor $Ld_1$, the second inductor $Ld_2$, the third inductor $Ld_3$, and the fourth inductor $Ld_4$ is optimized, and impacts caused by the external environment to the inductor value and coupling are mitigated. In addition, wounding about the same magnetic core or air core reduces a dimension of the circuit board and improves utilization rate of the space of the circuit board. In another aspect, the first parallel circuit and the third parallel circuit are connected to the two terminals of the first transmit coil respectively, and the second parallel circuit and the fourth parallel circuit are connected to the two terminals of the second transmit coil respectively, such that the impacts caused to the average potential of the transmit coils due to introduction of the decoupling circuit into the wireless charging transmitter system are eliminated.

Figure 3B:
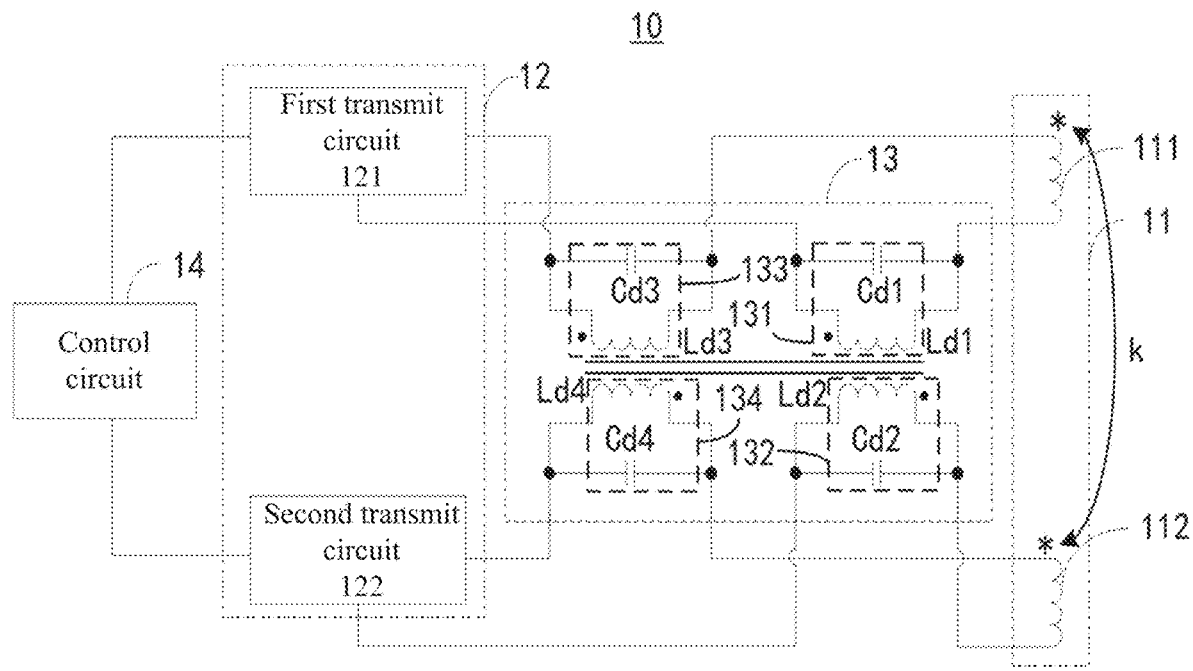
FIG. 3b is a schematic structural diagram of another wireless charging transmitter system according to an embodiment of the present disclosure.
Figure 3C:
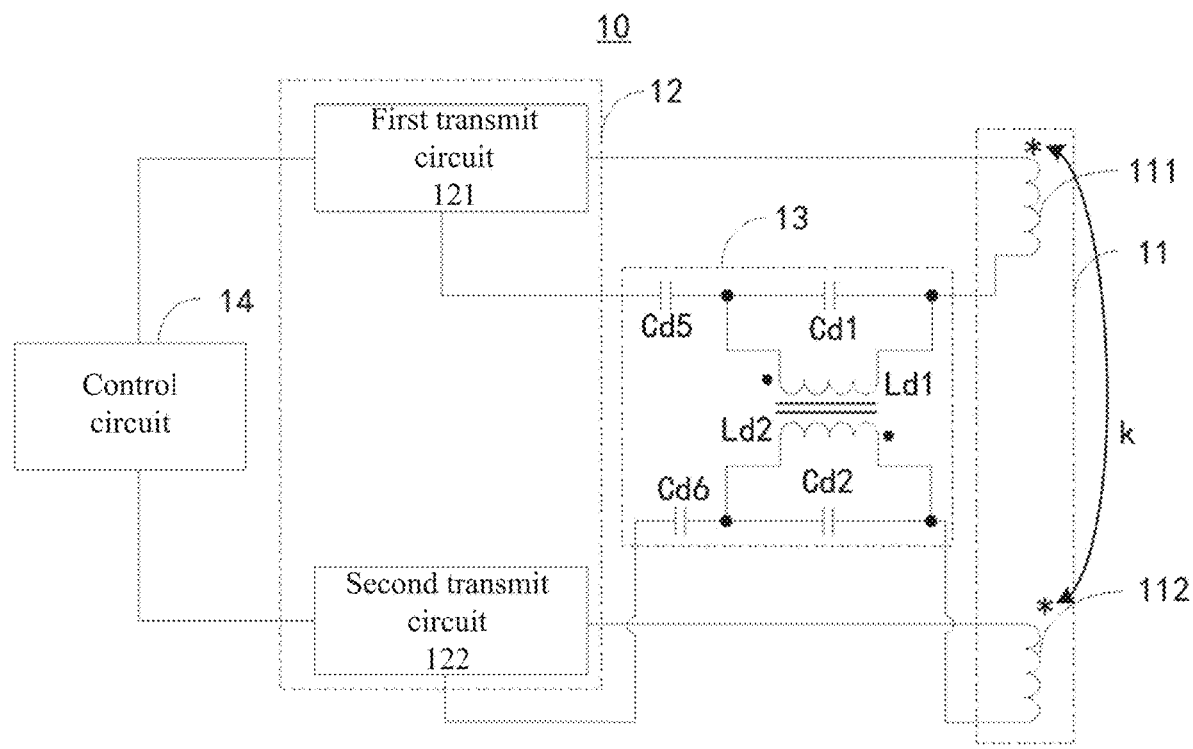
FIG. 3c is a schematic structural diagram of a wireless charging transmitter system according to an embodiment of the present disclosure.

Like the beneficial effect achieved by the embodiment as illustrated in FIG. 3b, an embodiment of the present disclosure further provides a circuit structure of a decoupling circuit, configured to eliminate the impacts caused to the average potential of the transmit coils due to introduction of the coupling circuit. Referring to FIG. 3c, the decoupling circuit 13 includes a fifth capacitor $Cd_5$ and a sixth capacitor $Cd_6$. The fifth capacitor $Cd_5$ is connected in series to the first parallel circuit 131. The sixth capacitor $Cd_6$ is connected in series to the second parallel circuit 132. The fifth capacitor $Cd_5$ and the first parallel circuit 131 form a series resonance in the vicinity of the operating frequency of the system. In the case that a current flows through the fifth capacitor $Cd_5$ and the first parallel circuit 131, a total voltage drop generated is zero. Likewise, the sixth capacitor $Cd_6$ and the second parallel circuit 132 also form a series resonance in the vicinity of the operating frequency of the system. In the case that a current flows through the sixth capacitor $Cd_6$ and the second parallel circuit 132, a total voltage drop generated is also zero. In this way, the impacts caused to the average potential of the transmit coils due to introduction of the decoupling circuit are eliminated.

Specifically, using the first parallel circuit as an example, referring to the decoupling principle described in the embodiment as illustrated in FIG. 3a, it is known that an equivalent inductance $Ld_{1+}$ of the first inductor with the first capacitor connected in parallel is $Ld_{1+}=Ld_1/(1-\omega^2 Ld_1 Cd_1)$, and the fifth capacitor $Cd_5$ is connected in series to the first parallel circuit 131, wherein the fifth capacitor $Cd_5$ and an equivalent inductance of the first parallel circuit form a resonance at the operating frequency of the transmitter system, that is, $Cd_5=1/\omega^2 Ld_{1+}$. Likewise, in the case that the sixth capacitor $Cd_6$ is connected in series to the second parallel circuit 132, the sixth capacitor $Cd_6$ and an equivalent inductance of the second parallel circuit form a resonance at the operating frequency of the transmitter system, that is, $Cd_6=1/\omega^2 Ld_{2+}$. In this way, the impacts caused to the average potential of the transmit coils due to introduction of the decoupling circuit are eliminated.

In this embodiment, the decoupling circuit is introduced, and the decoupling circuit is connected to any two coupled transmit coils. The decoupling circuit generates, based on the induced electromotive force generated in the two transmit coils due to spatial coupling, the induced electromotive force opposite to the induced electromotive force generated due to spatial coupling. In this way, the induced electromotive force generated due to coupling of the transmit coils in the wireless charging transmitter system is offset, and thus power loss of the system is reduced.

The wireless charging transmitter system transmits power based on the principle of electromagnetic induction, and is easily subject to impacts from the external environment during transmission of power. Especially in the case that metal substances are present in the external environment, the metal substances may affect magnetic fields generated by the transmit coils, and change coupling between the transmit coil, which results in power loss and reduction of efficiency in the wireless charging transmitter system. It is apparent that by decoupling the transmit coils by adjusting the decoupling circuit in the wireless charging transmitter system in accordance with the current charging environment, power loss of a multi-coil transmitter system is reduced, and efficiency of the system is improved.

Figure 4:
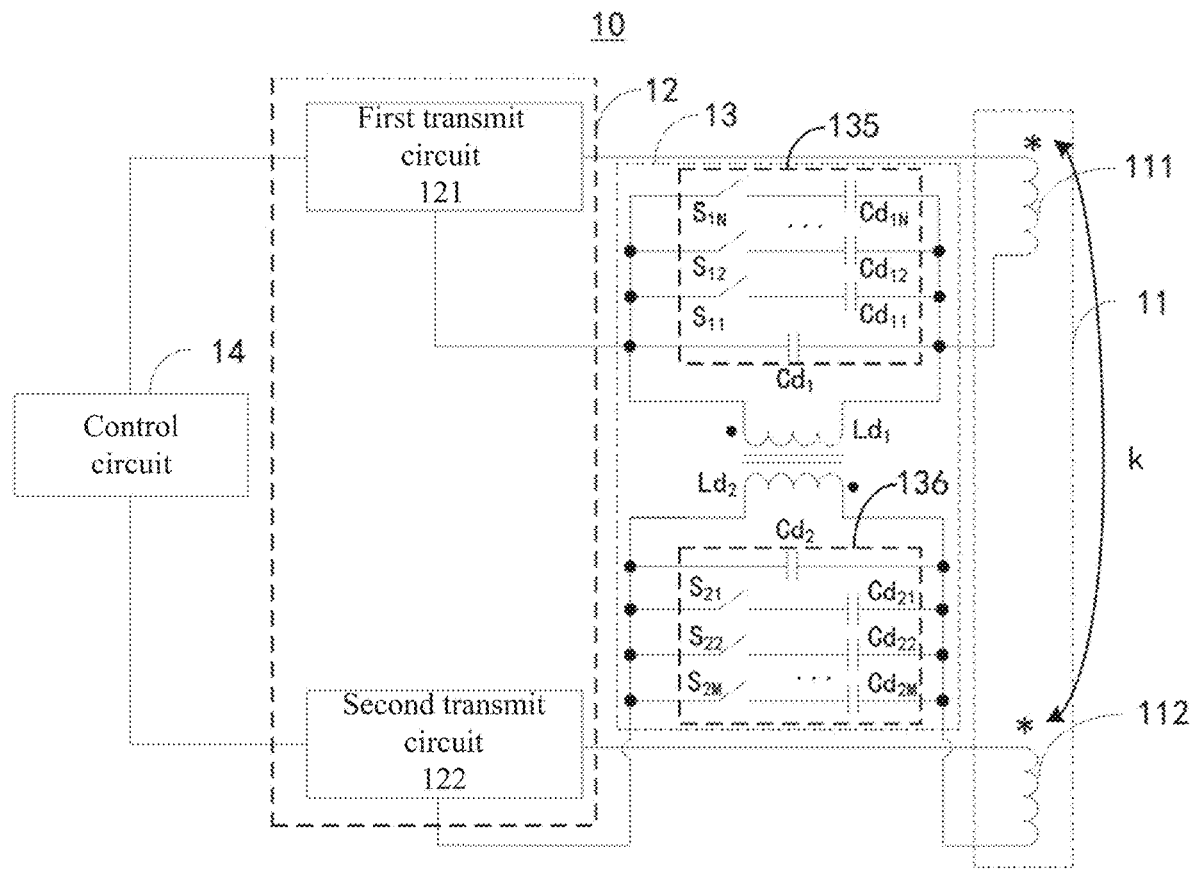
FIG. 4 is a schematic structural diagram of another wireless charging transmitter system according to an embodiment of the present disclosure.

Accordingly, in some other embodiments, referring to FIG. 4, the decoupling circuit 13 includes a first inductor $Ld_1$, a second inductor $Ld_2$, a first capacitor $Cd_1$, a second capacitor $Cd_2$, a first compensation circuit 135, and a second compensation circuit 136. The first inductor $Ld_1$ and the first capacitor $Cd_2$ form a first parallel circuit 131, the second inductor $Ld_2$ and the second capacitor $Cd_2$ form a second parallel circuit 132. The first compensation circuit 135 is connected in parallel with the first parallel circuit 131, and the second compensation circuit 136 is connected in parallel with the second parallel circuit 132. The first inductor $Ld_1$ and the second inductor $Ld_2$ are wound about the same magnetic core or air core, and a first terminal of the first inductor $Ld_1$ and a first terminal or a second terminal of the second inductor $Ld_2$ are dotted terminals. The first compensation circuit 135 includes N groups of first series circuits each formed by a compensation capacitor $Cd_{1N}$ and a switch $S_{1N}$, wherein the N groups of first series circuits are connected in parallel. The second compensation circuit includes M groups of second series circuits each formed by a compensation capacitor $Cd_{2M}$ and a switch $S_{2M}$, wherein the M groups of second series circuits are connected in parallel, and M and N are a positive integer and M+N is greater than 1. The switch $S_{1N}$ and the switch $S_{2M}$ are both MOSFET switches or relays. The control circuit 14 controls the N switches $S_{1N}$ in the first compensation circuit and/or the M switches $S_{2M}$ in the second compensation circuit to respectively operates in an on or an off state, such that the induced circuit parameters at output terminals of the transmit circuits satisfy predetermined threshold conditions. For the specific control principle, reference may be made to the embodiments hereinafter illustrating the method for controlling the wireless charging transmitter system, which is not described herein any further.

In this embodiment, the decoupling principle of the decoupling circuit is the same as the decoupling principle described in the embodiment as illustrated in FIG. 3a. However, in this embodiment, the decoupling circuit further includes a first compensation circuit 135 and a second compensation circuit 136. The first compensation circuit 135 includes N groups of first series circuits each formed by a compensation capacitor $Cd_{1N}$ and a switch $S_{1N}$, and the N groups of first series circuits are connected in parallel. The second compensation circuit includes M groups of second series circuits each formed by a compensation capacitor $Cd_{2M}$ and a switch $S_{2M}$, and the M groups of second series circuits are connected in parallel. In this way, an equivalent inductance $Ld_{1+}$ of the first inductor $Ld_1$ is $Ld_{1+}=Ld_1/(1-\omega^2 Ld_1 Cd'_1)$, and an equivalent inductance $Ld_{2+}$ of the second inductor $Ld_2$ is $Ld_{2+}=Ld_2/(1-\omega^2 Ld_2 Cd'_2)$. $Cd'_1$ is a total inductance of capacitors connected in parallel between two terminals of the first inductor, including the first capacitor and the compensation capacitor $Cd_{1N}$. $Cd'_2$ is a total inductance of the capacitors connected in parallel between two terminals of the second inductor, including the second capacitor and the compensation capacitor $Cd_{2M}$. It may be understood that only in the case that the switch connected in series to the compensation capacitor is in an on state, the compensation capacitor is capable of operating. Accordingly, the decoupling circuit may change the total capacitance of the capacitors connected in parallel with the inductors in the decoupling circuit by controlling the on or off state of the switches, such that precision and range of adjustment of the equivalent inductance Md between the first inductor and the second inductor in the decoupling circuit are further improved.

In some embodiments, the definition that M+N is greater than or equal to 1 includes two cases: M=0 and N≥1, and N=0 and M≥1. In the case that M=0 or N=0, the decoupling circuit 13 exhibits single-side compensation. That is, the equivalent inductance is adjusted by the first compensation circuit or the second compensation circuit.

In some embodiments, the capacitances between the N compensation capacitors in the first compensation circuit are set at a ratio of $2^N$, and the capacitances between the M compensation capacitors in the second compensation circuit are set at a ratio of $2^M$, such that the compensation circuits in parallel may achieve uniform distribution of the total capacitance, and the adjustment precision and operability of the decoupling circuit are improved. For example, the capacitance of the capacitor $Cd_{12}$ is twice the capacitance of the capacitor $Cd_{11}$, and the capacitance of the capacitor $Cd_{13}$ is twice the capacitance of the capacitor $Cd_{12}$, that is, $Cd_{11}=\frac{1}{2}Cd_{12}=\frac{1}{4}Cd_{13}$, and analogously, that is, $$Cd_{11} = \frac{1}{2}Cd_{12} = \frac{1}{4}Cd_{13} = \ldots = \frac{1}{2^{N-1}}Cd_{1N}.$$

Similarly, the capacitance of the capacitor $Cd_{22}$ is twice the capacitance of the capacitor $Cd_{21}$, and the capacitance of the capacitor $Cd_{23}$ is twice the capacitance of the capacitor $Cd_{22}$, that is, $Cd=\frac{1}{2}Cd_{22}=\frac{1}{4}Cd_{23}$, and analogously $$Cd_{21} = \frac{1}{2}Cd_{22} = \frac{1}{4}Cd_{23} = \ldots = \frac{1}{2^{M-1}}Cd_{2M}.$$

In this embodiment, the first compensation circuit and the second compensation circuit are added in the decoupling circuit. The first compensation circuit includes N groups of first series circuits each formed by a compensation capacitor and a switch, wherein the N groups of first series circuits are connected in parallel. The second compensation circuit includes M groups of second series circuits each formed by a compensation capacitor and a switch, wherein the M groups of second series circuits are connected in parallel. In addition, the first compensation circuit is connected in parallel with the first parallel circuit and the second compensation circuit is connected in parallel with the second parallel circuit. The switches in the first compensation circuit and the second compensation circuit are adjusted to activate the compensation circuit connected in series to the switches, the compensation capacitances connected in parallel with the decoupling circuit are dynamically adjusted, an equivalent mutual inductance value of the decoupling circuit is dynamically adjusted according to the charging environment, the induced circuit parameters at output terminals of the transmit circuits satisfy predetermined threshold conditions, such that power loss of a transmitter system caused by the coupling is reduced, and decoupling precision of the decoupling circuit is improved.

Figure 5:
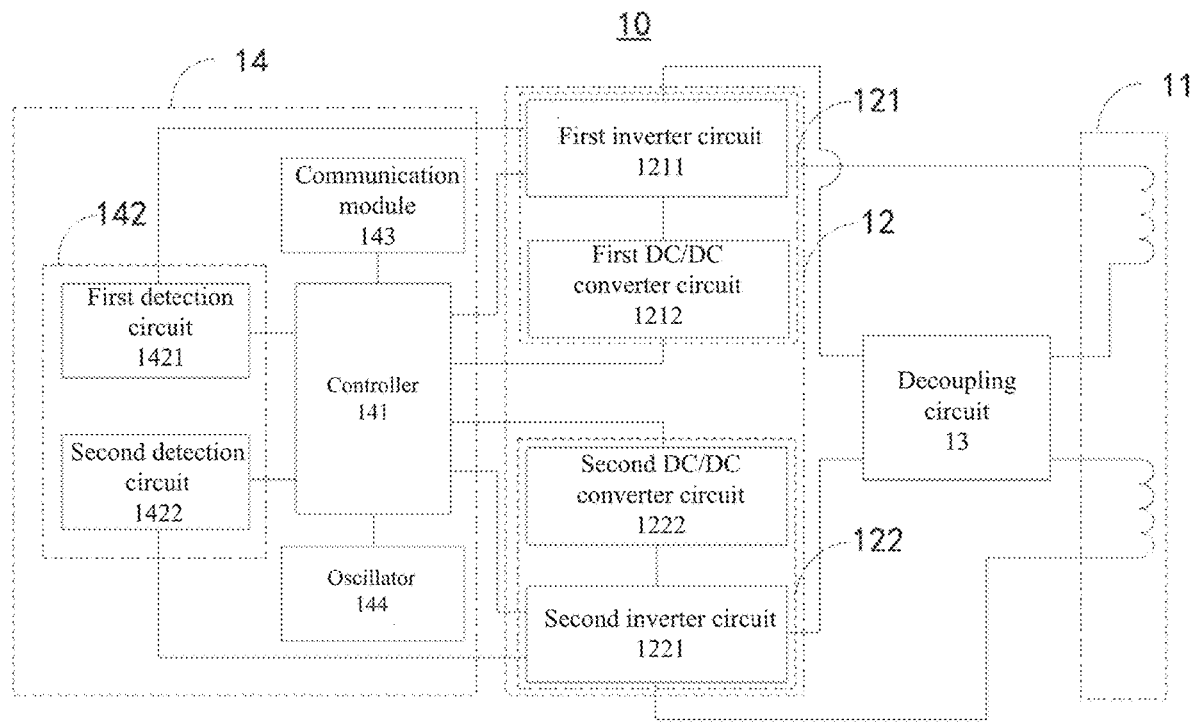
FIG. 5 is a schematic structural diagram of a wireless charging transmitter system according to an embodiment of the present disclosure.

The control circuit 14 is electrically connected to the at least two transmit circuits 12, and is configured to control and detect the alternating current output by each transmit circuit. Referring to FIG. 5, the control circuit 14 includes a controller 141, a detection circuit 142, and a communication module 143, wherein the controller 141 is electrically connected to the detection circuit 142 and the communication module 143. The detection circuit 142 measures a plurality of physical quantities of the transmit circuits 12, and transmits a detection signal to the controller 141 to assist the controller 141 to control an operating state of the system. Signals acquired by the detection circuit 142 include, but are not limited to, direct-current input voltages and currents, and alternating-current output voltages and currents of the transmit circuits 12. In some embodiments, a plurality of detection circuits 142 may be configured, and each of the transmit circuits 12 corresponds to one detection circuit 142.

In some embodiments, the controller 141 may be a general processor, a digital signal processor (DSP), an application specific integrated circuit (ASIC), a field programmable gate array (FPGA), a microcontroller unit, an Acorn RISC machine (ARM), or another programmable logic device, a discrete gate or transistor logic device, or a discrete hardware component or a combination of these components. Further, the controller 141 may also be any traditional processor, controller, microcontroller, or state machine. The controller 141 may also be practiced as a combination of computing devices, for example, a combination of a DSP and a microprocessor, a plurality of microprocessors, one or more microprocessors plus a DSP core, and/or any other such configuration.

In some other embodiments, the detection circuit 142 includes a first detection circuit 1421 and a second detection circuit 1422. The first detection circuit 1421 is electrically connected to the first inverter circuit 1211 and the controller 141. The second detection circuit 1422 is electrically connected to the second inverter circuit 1221 and the controller 141. The signals acquired by the detection circuit 142 may include an input impedance of an equivalent load at an output port of the inverter circuit, may include an amplitude, a phase and the like of the input impedance of the equivalent load, or may include a temperature signal of the system, a direct-current input voltage and current and the like of the inverter circuit. For example, the first detection circuit 1421 detects a first input impedance of an equivalent load at an output port of the first inverter circuit 1211, and the second detection circuit 1422 detects a second input impedance of an equivalent load at an output port of the second inverter circuit 1221. In addition, the first input impedance and the second input impedance are both transmitted to the controller 141, such that the controller 141 processes and analyzes the impedances. The input impedance of the equivalent load detected by the detection circuit 142 may reflect the coupling relationship between the transmit coil 11 and the receive coil at the receiver.

The communication module 143 is configured to detect the coupling relationship between each of the transmit coils and the receive coil, and send the detected coupling relationship to the controller 141, such that the controller 141 controls, according to the coupling relationship, the current output by each transmit circuit 12 to control the current parameter of each transmit coil 11 and control at least two transmit coils 11 to simultaneously transmit power to the receive coil 21 based on the current parameter.

In some embodiments, the control circuit 14 further includes an oscillator 144. The oscillator 144 is electrically connected to the controller 141, and is configured to supply a clock signal. The controller 141 may transmit the clock signal supplied by the oscillator 144 to the inverter circuit of each of the transmit circuits 12 as a reference for generating the drive signal. In the process of assigning clock signals by the controller 141, a delay between two reference signals may be adjusted to control the current phase and the orientations of spatial magnetic fields of the transmit coils 11.

The transmit circuits are configured to supply power to the transmit coils connected thereto. In this embodiment, still referring to FIG. 5, using two transmit coils as an example, the first transmit circuit 121 in the wireless charging transmitter system 10 includes a first inverter circuit 1211. The first inverter circuit 1211 is electrically connected to the first transmit coil 111, the direct-current power source 200, and the controller 141. The first transmit circuit 121 is configured to convert a direct current output by the direct-current power source 200 to an alternating current, and transmit the alternating current to the first transmit coil 111. Likewise, the second transmit circuits 122 includes a second inverter circuit 1221. The second inverter circuit 1221 is electrically connected to the second transmit coil 112, the direct-current power source 200, and the controller 141. The second inverter circuit 122 is configured to convert a direct current output by the direct-current power source 200 to an alternating current, and transmit the alternating current to the second transmit coil 112. Each of the transmit circuits 12 includes one inverter circuit. One inverter circuit corresponds to one transmit coil 11. The controller 141 directly supplies a drive signal to the inverter circuit to drive the inverter circuit to operate. The drive signal may be a switch signal subjected to pulse width modulation (PWM). The pulse width modulated signals supplied to the inverter circuits are all based on the same frequency signal, and phase coherence is ensured. The controller 141 may adjust phases between the pulse width modulated signals supplied to the inverter circuits, to control a current phase relationship of each of the transmit coils 11 and hence to adjust an orientation of a combined magnetic field generated.

In some embodiments, the first transmit circuit 121 further includes a first DC/DC converter circuit 1212. The first DC/DC converter circuit 1212 is electrically connected to the direct-current power source 200 (not illustrated), the first inverter circuit 1211, and the controller 141, and is configured to regulate an output voltage of the direct-current power source 200 and transmit the regulated voltage to the first inverter circuit 1211. Likewise, the second transmit circuit 122 further includes a second DC/DC converter circuit 1222. The second DC/DC converter circuit 1222 is electrically connected to the direct-current power source 200 (not illustrated), the first inverter circuit 1211 and the controller 141, and is configured to regulate an output voltage of the direct-current power source 200 and transmit the regulated voltage to the second inverter circuit 1221. The first DC/DC converter circuit 1212 and the second DC/DC converter 1222 may achieve a buck-boost effect, and buck and boost the output voltage of the direct-current power source 200 to obtain a suitable direct-current voltage. The direct-current voltage then acts on the first inverter circuit 1211 and the second inverter circuit 1221, and the first inverter circuit 1211 and the second inverter circuit 1221 convert the voltage. The controller 141 may control the first DC/DC converter circuit 1212 and the second DC/DC converter circuit 1222 to regulate input direct-current voltages supplied to the first inverter circuit 1211 and the second inverter circuit 1221, and hence to control amplitudes of currents supplied by the first inverter circuit 1211 and the second inverter circuit 1221 to the first transmit coil 111 and the second transmit coil 112.

In practice, a receiver device may be charged in different spatial postures, the wireless charging transmitter system 10 may correspondingly separately control each of the transmit circuits 12 based on the coupling relationship between each of the transmit coils 11 and the receive coil at the receiver in a current posture, and thus supply a suitable current to each of the transmit coils 11. The current of each of the transmit coils 11 generates a corresponding magnetic field, and generates a superimposed magnetic field at the receiver. The superimposed magnetic field may have an even greater amplitude relative to a magnetic field generated by operating of a single transmit coil 11. In addition, the transmit coil 11 may be better matched with the receive coil at the receiver in terms of orientation, and thus a better coupling therebetween may be achieved. In this way, when the receiver is being charged in the current posture, under a collaborative effect by the stronger magnetic field and the better coupling, the system is capable of achieving higher energy transmission efficiency.

Figure 6A:
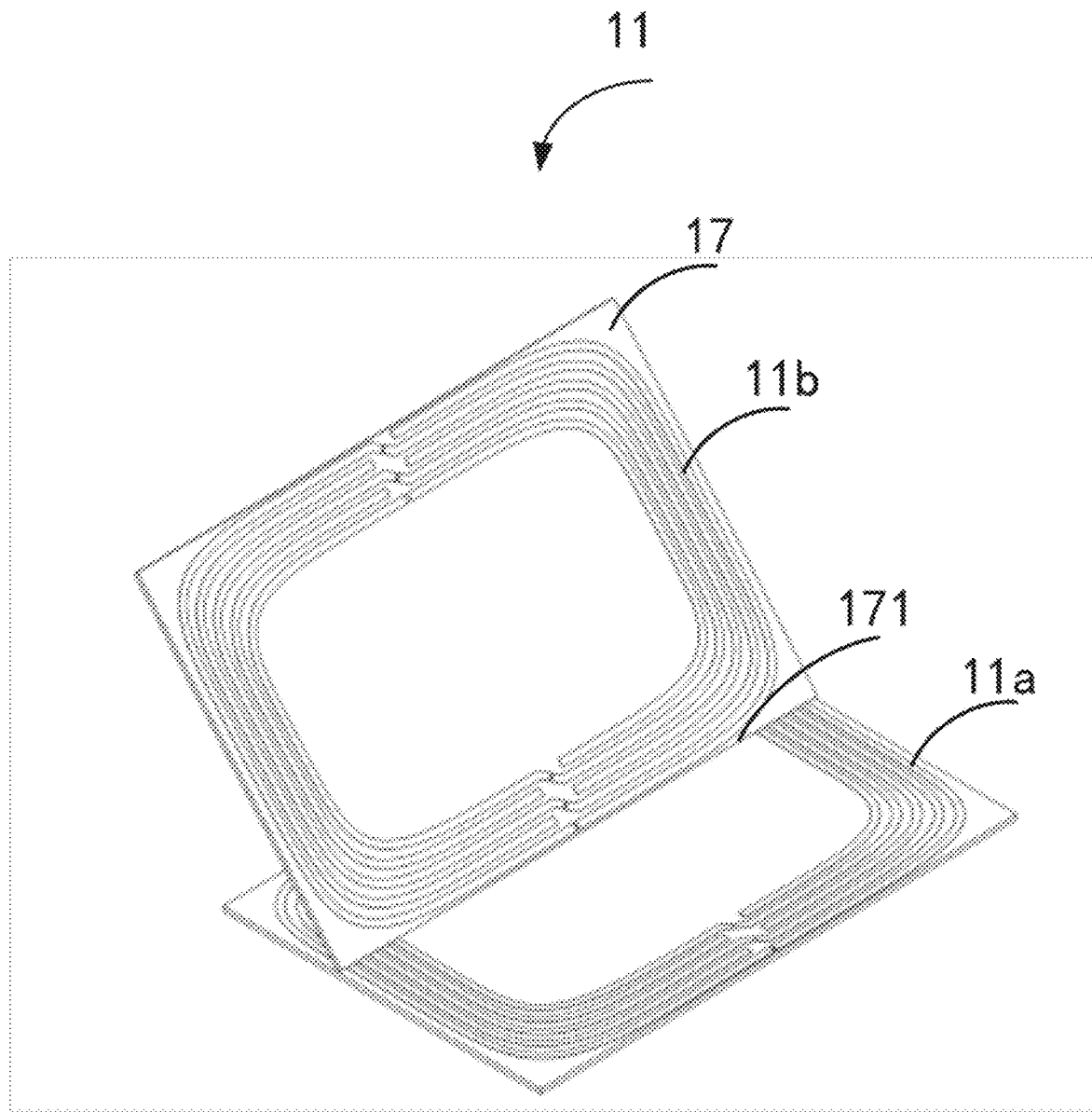
FIG. 6a is a schematic structural diagram of two transmit coils according to an embodiment of the present disclosure.
Figure 6B:
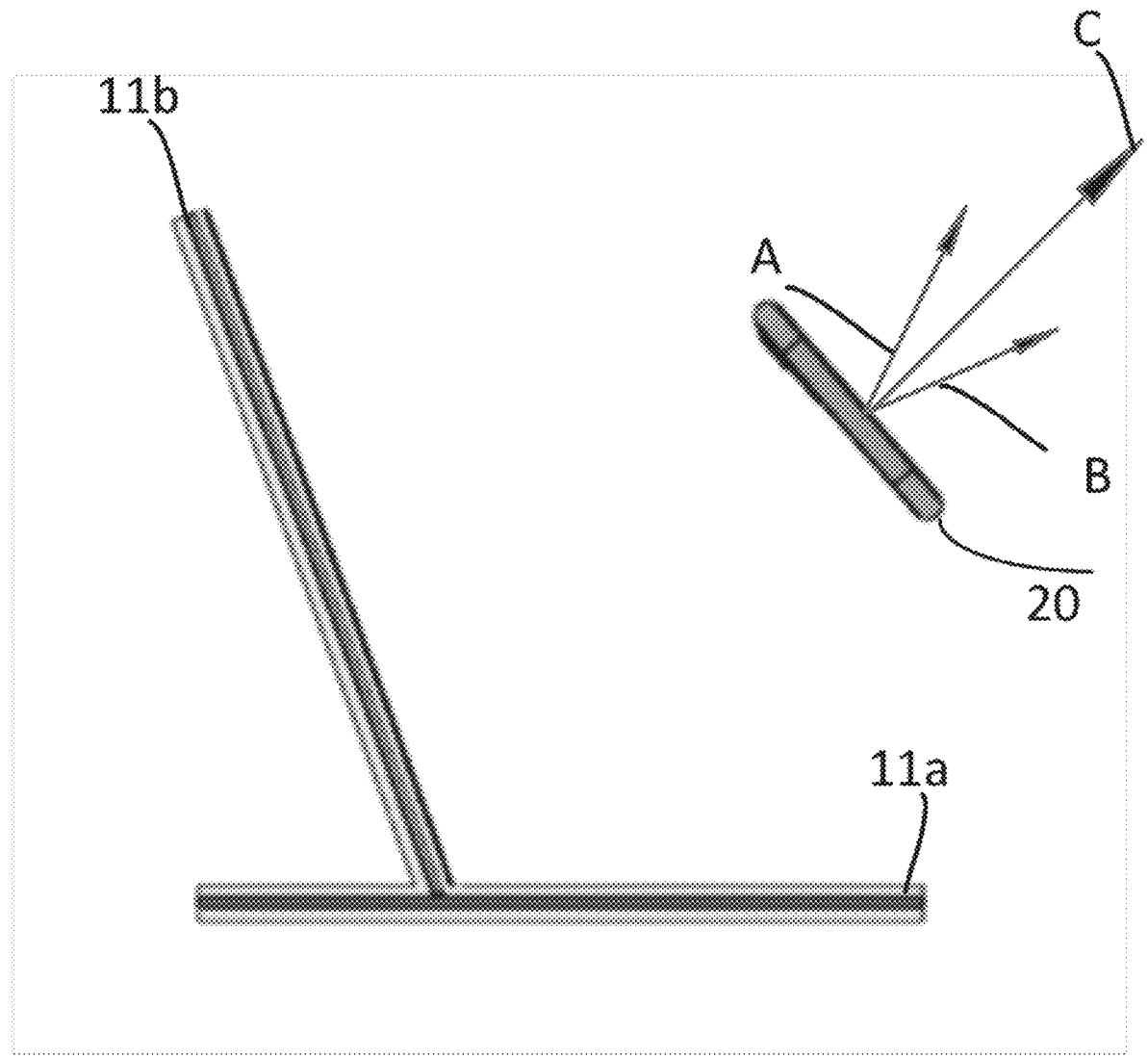
FIG. 6b is a schematic diagram illustrating generation of magnetic fields and superimposed magnetic fields by two transmit coils according to an embodiment of the present disclosure.

For example, as illustrated in FIG. 6a, FIG. 6a illustrates a structure of the transmit coil according to an embodiment of the present disclosure. The at least two transmit coils 11 include a first planar coil 11a and a second planar coil 11b. The plane where the first planar coil 11a is disposed is a first plane, and the plane where the second planar coil 11b is disposed is a second plane. The first planar coil 11a is horizontally disposed, and the first plane and the second plane are intersected to form an intersection line 171. The first planar coil 11a is intersected with the second planar coil 11b. The second planar coil 11b is disposed on a side of the first plane coil 11a. Respective support structures 17 (which are printed circuit boards, PCBs herein) of these two planar coils are mechanically connected. The intersection line 171 of the two coils are an intersection line between the circuit boards. Magnetic fields generated by the first planar coil 11a and the second planar coil 11b are as illustrated in FIG. 6b. The magnetic field generated by the first planar coil 11a is a magnetic field A, and the magnetic field generated by the second planar coil 11b is a magnetic field B. A superimposed magnetic field generated by these two magnetic fields in the wireless charging receiver system 20 (a mobile phone is used as an example in the drawings) is a magnetic field C. The superimposed magnetic field may have an even greater amplitude relative to the single magnetic field A and the single magnetic field B, and thus the transmit coil 11 may be better matched with the receive coil at the receiver in terms of orientation. In this way, a better coupling therebetween may be achieved, and the system is capable of achieving higher energy transmission efficiency.

In some embodiments, if the at least two transmit coils 11 have three coils or more coils, each of the transmit coils 11 corresponds to one transmit circuit 12, and in each of the transmit circuits 12, the DC/DC converter circuit is power supplied by the same direct-current power source 200.

Figure 7A:
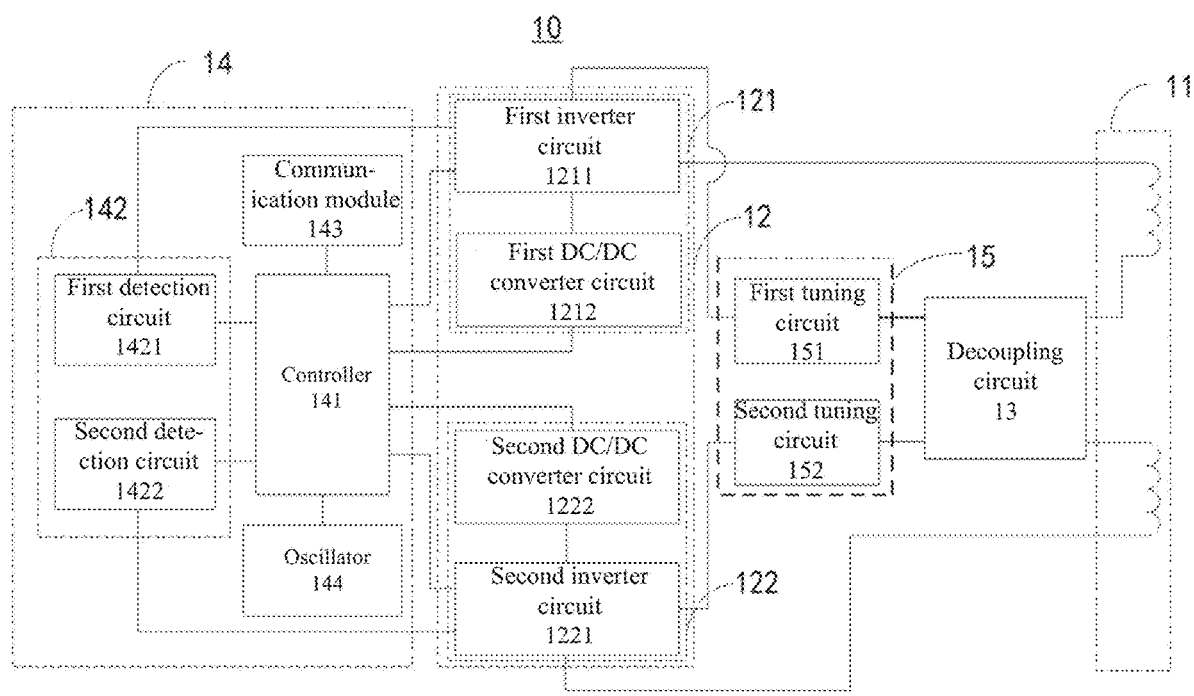
FIG. 7a is a schematic structural diagram of a wireless charging transmitter system according to an embodiment of the present disclosure.

In some embodiments, referring to FIG. 7a, the wireless charging transmitter system 10 further includes at least two tuning circuits 15. The tuning circuits 15 include a first tuning circuit 151 and a second tuning circuit 152. The first tuning circuit 151 is electrically connected to the first inverter circuit 1211, the first transmit coil 111, and the controller 141, and is configured to tune the first transmit coil 111. Likewise, the second tuning circuit 1223 is electrically connected to the second inverter circuit 1221, the second transmit coil 112, and the controller 141, and is configured to tune the second transmit coil 112. The first transmit coil 111 and the first inverter circuit 1211 are coupled to each other by the first tuning circuit 151, and the second transmit coil 112 and the second inverter circuit 1221 are coupled to each other by the second tuning circuit 152. In this embodiment, the first tuning circuit 151 and the first parallel circuit 131 are arranged on the same end side of the first transmit coil 111, and the second tuning circuit 152 and the second parallel circuit 132 are arranged on the same end side of the second transmit coil 112, such that the impacts to the average potential of the transmit coils due to introduction of the equivalent inductance into the system by the decoupling circuit are partially offset.

In some embodiments, the tuning circuit 15 is formed of a fixed passive device, and statically tunes the transmit coils 11.

Figure 7B:
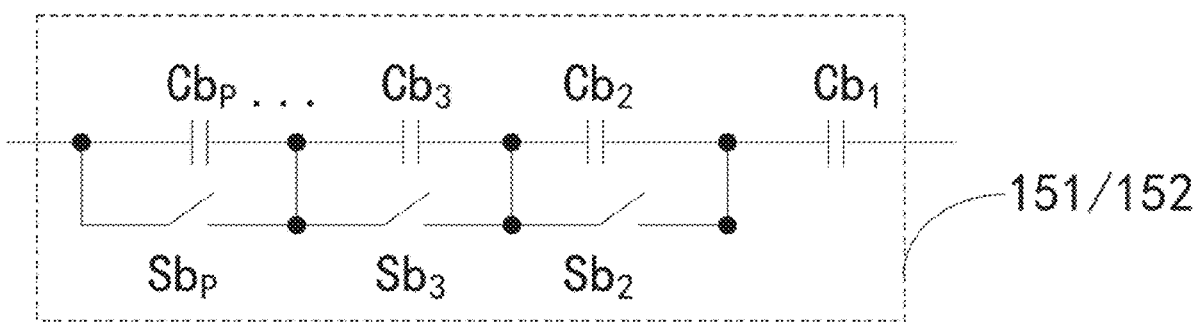
FIG. 7b is a schematic structural diagram of a tuning circuit according to an embodiment of the present disclosure.

In some other embodiments, the tuning circuit 15 includes an active device (for example, a switch), and dynamically tunes the transmit coils. The tuning circuit 15 is connected to the controller 141. The controller 141 may dynamically adjust the tuning circuit 15 based on detection information (for example, the input impedance of the equivalent load of the inverter circuit) provided by the detection circuit 142, such that the inverter circuit is capable of more efficiently operating. Specifically, referring to FIG. 7b, the tuning circuits include P tuning capacitors $Cb_{P-1}$ that are arranged in series, and tuning switches $Sb_P$ respectively connected in parallel with any P−1 tuning capacitors of the P tuning capacitors $Cb_{P-1}$, wherein the tuning switches $Sb_P$ are configured to control the tuning capacitors connected in parallel thereto to be in an operating state or a short-circuit state, wherein P is an integer number equal or greater than 2. The controller 141 controls P−1 tuning switches $Sb_P$ to operate in an on or an off state, and hence the tuning capacitors connected to these switches are turned off or activated. In this way, the variable coupling inductance between the transmit coils is dynamically adjusted by the tuning circuits, and operating efficiency of the wireless charging transmitter system is improved.

In some embodiments, capacitances of the P tuning capacitors are arranged in a ratio of $2^P$, that is, $$Cb_1 = \frac{1}{2}Cb_2 = \frac{1}{4}Cb_3 = \ldots = \frac{1}{2^{p-2}}Cb_{p-1},$$

and thus tuning precision of the tuning circuits is improved.

In the case that any transmit circuit in the wireless charging transmitter system is controlled to generate an excitation current, due to spatial coupling between the transmit coils, an induced current and an induced voltage are generated in the transmit coils under coupling, and hence power loss of the wireless charging transmitter system is increased. To reduce power loss of the system, at an initial stage of power-up of the system, the system is subjected to environmental calibration, and the circuit parameters of the decoupling circuit are dynamically adjusted to offset the induced current and the induced voltage generated in the circuit due to coupling.

Figure 8B:
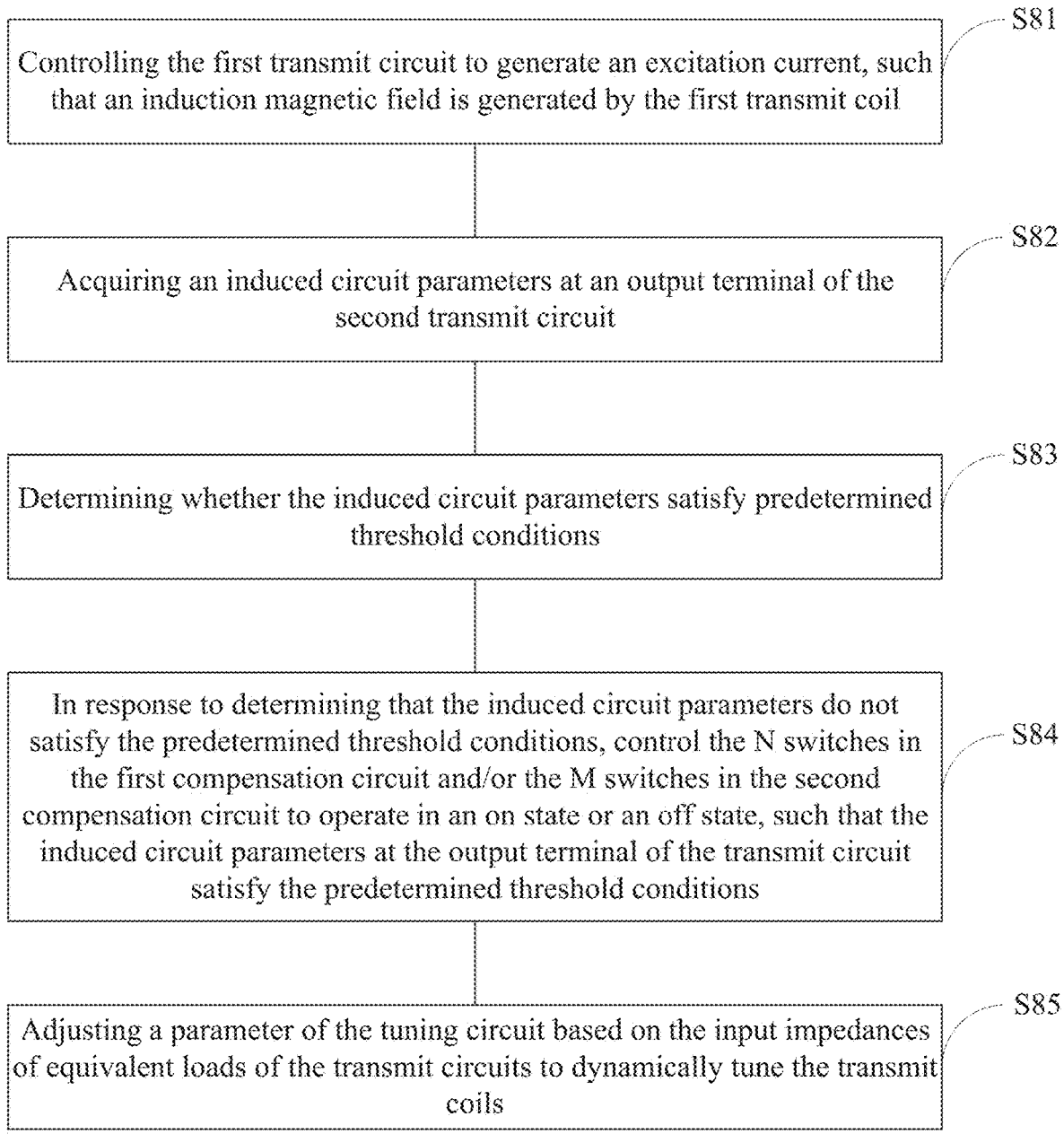
FIG. 8b is a schematic flowchart of a method for controlling a wireless charging transmitter according to an embodiment of the present disclosure.

Referring to FIG. 8a, an embodiment of the present disclosure further provides a method for controlling the wireless charging transmitter system. The method is applicable to the wireless charging transmitter system as described above, wherein the at least two transmit coils include a first transmit coil and a second transmit coil, and the at least two transmit circuits include a first transmit circuit and a second transmit circuit. The first transmit circuit is electrically connected to the first transmit coil, the second transmit circuit is electrically connected to the second transmit coil, the first inductor is connected to the first transmit coil, and the second inductor is connected to the second transmit coil. The method includes the following steps:

In S81, the first transmit circuit is controlled to generate an excitation current, such that an induction magnetic field is generated by the first transmit coil.

In S82, an induced circuit parameters at an output terminal of the second transmit circuit are acquired.

It should be noted that the induced circuit parameters in the second transmit circuit are generated by coupling between the second transmit coil in the second transmit circuit and the first transmit coil in the first transmit circuit.

In S83, whether the induced circuit parameters satisfy predetermined threshold conditions is determined.

In S84, in response to determining that the induced circuit parameters do not satisfy the predetermined threshold conditions, the N switches in the first compensation circuit and/or the M switches in the second compensation circuit are controlled to operate in an on state or an off state, such that the induced circuit parameters at the output terminal of the transmit circuit satisfy the predetermined threshold conditions.

In the case that a switch is in the on state, the compensation capacitor connected in series thereto is activated, and the compensation capacitor is configured to compensate the current flowing through the decoupling circuit. In the case that a switch is in the off state, the compensation capacitor connected in series thereto is deactivated, and the compensation circuit is in a non-operating state.

In this embodiment, the predetermined threshold conditions mean that the induced voltage is less than or equal to a predetermined voltage threshold, and the induced current is less than or equal to a predetermined current threshold. In response to determining that the induced circuit parameters do not satisfy the predetermined threshold conditions, the N switches in the first compensation circuit and/or the M switches in the second compensation circuit are controlled to operate in the on state or off state, such that the induced circuit parameters at the output terminal of the transmit circuit satisfy the predetermined threshold conditions. In response to determining that the induced circuit parameters satisfy the predetermined threshold conditions, on or off states of the N switches in the first compensation circuit and/or the M switches in the second compensation circuit do not need to be changed.

It should be noted that in the case that the wireless charging transmitter system includes three or more than three transmit coils, the transmit circuits corresponding to the three transmit coils are successively controlled to generate an excitation current, and the inductive parameters at the output terminals of the other transmit circuits are detected to adjust the corresponding switches in the decoupling circuit to be in an on state or an off state, and hence to adjust the capacitances of the compensation capacitors connected in parallel in the decoupling circuit. In this way, the induced circuit parameters at the output terminals of the transmit circuits satisfy the predetermined threshold conditions.

The induced circuit parameters include an induced voltage and an induced current and are acquired by the detection circuit by acquiring input terminal signals of the transmit circuits. The system calculates an equivalent impedance of the circuit based on the induced voltage and the induced current. The equivalent impedance is configured to indicate a strength of coupling between the first transmit coil and the second transmit coil. In some other embodiments, referring to FIG. 8b, the system further includes a tuning circuit, wherein the tuning circuit is electrically connected to the transmit circuits, the transmit coils, and the control circuit. The method further includes:

In S85, a parameter of the tuning circuit is adjusted based on the input impedances of equivalent loads of the transmit circuits to dynamically tune the transmit coils.

In this embodiment, adjusting the parameter of the tuning circuit refers to controlling the tuning switch in the tuning circuit to be turned on or turned off, such that the corresponding tuning capacitor is in an activated state or a deactivated state. In this way, the capacitances of the tuning capacitors connected in parallel in the tuning circuits are adjusted, and hence the transmit coils are dynamically tuned.

According to the embodiments of the present disclosure, the decoupling circuit is arranged between any two coupled transmit coils. The decoupling circuit further includes a first compensation circuit and a second compensation circuit, wherein the first compensation circuit is connected in parallel with the first parallel circuit, and the second compensation circuit is connected in parallel with the second parallel circuit. The first compensation circuit includes N groups of first series circuits each formed by a compensation capacitor and a switch, wherein the N groups of first series circuits are connected in parallel; and the second compensation circuit includes M groups of second series circuits each formed by a compensation capacitor and a switch. By controlling the N switches in the first compensation circuit and/or the M switches in the second compensation circuit to operate in the on state or off state, the compensation capacitors connected in parallel with two terminals of the first inductor and the second inductor are controlled in the operating state or non-operating state, capacitances of the compensation capacitors connected in parallel with the decoupling circuit are dynamically adjusted, the equivalent mutual inductance of the decoupling circuit is dynamically adjusted according to the charging environment, and the decoupling precision of the decoupling circuit is improved.

Figure 9:
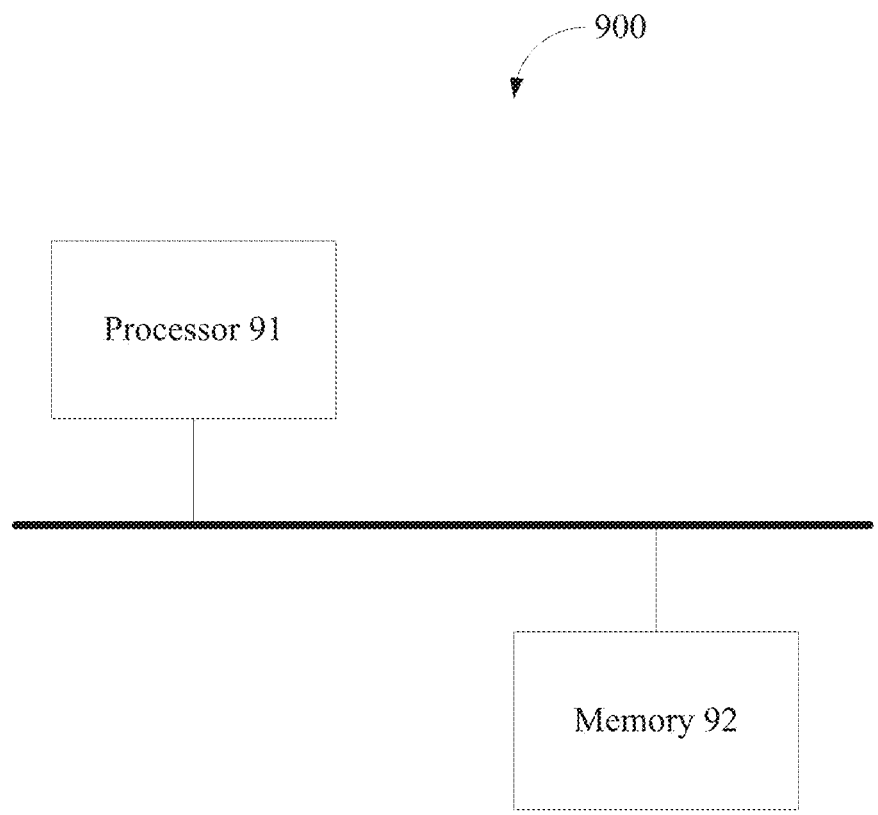
FIG. 9 is a schematic structural diagram of a controller according to an embodiment of the present disclosure.

Referring to FIG. 9, FIG. 9 is a schematic structural diagram of a controller 900 according to an embodiment of the present disclosure. As illustrated in FIG. 9, the controller 900 includes at least one processor 91 and a memory 92. FIG. 9 uses one processor 91 as an example.

The processor 91 and the memory 92 may be connected via a bus or in another manner, and FIG. 9 uses the bus as an example.

The memory 92, as a non-volatile computer-readable storage medium, may be configured to store non-volatile software programs, non-volatile computer-executable programs and modules, for example, the program instructions/modules corresponding to the method for controlling the wireless charging transmitter system according to an embodiment of the present disclosure. The non-volatile software programs, instructions and modules stored in the memory 92, when executed, cause the at least one processor 91 to perform various function applications and data processing of the apparatus for controlling the wireless charging transmitter system, that is, performing the method for controlling the wireless charging transmitter system and implementing the functions of the modules or units in the above apparatus embodiments.

In addition, the memory 92 may include a high speed random access memory, or may include a non-volatile memory, for example, at least one disk storage device, a flash memory device, or another non-volatile solid storage device. In some embodiments, the memory 92 optionally includes memories remotely configured relative to the processor 91. These memories may be connected to the processor 91 over a network. Examples of the above network include, but not limited to, the Internet, Intranet, local area network, mobile communication network and a combination thereof.

One or more instructions/modules are stored in the memory 92, and when being executed by the at least one processor 91, perform the method for controlling the wireless charging transmitter system according to any of the above method embodiments.

An embodiment of the present disclosure provides a computer program product, wherein the computer program product includes at least one computer program stored in a non-volatile computer readable storage medium. The at least one computer program includes at least one program instruction, which, when executed by an electronic device, causes the electronic device to perform the method for controlling the wireless charging transmitter system.

The above described apparatus or device embodiments are merely for illustration purpose only. The modules and units which are described as separate components may be physically separated or may be not physically separated, and the components which are illustrated as modules and units may be or may not be physical modules and units, that is, the components may be located in the same position or may be distributed into a plurality of network modules and units. Part or all of the modules may be selected according to the actual needs to achieve the objects of the technical solutions of the embodiments.

According to the above embodiments of the present disclosure, a person skilled in the art may clearly understand that the embodiments of the present disclosure may be implemented by means of hardware or by means of software plus a necessary general hardware platform. Based on such understanding, portions of the technical solutions of the present disclosure that essentially contribute to the related art may be embodied in the form of a software product, the computer software product may be stored in a storage medium, such as a ROM/RAM, a magnetic disk, or a CD-ROM, including several instructions for causing a computer device (a personal computer, a server, or a network device) to perform the various embodiments of the present disclosure, or certain portions of the method of the embodiments.

Finally, it should be noted that the above embodiments are merely used to illustrate the technical solutions of the present disclosure rather than limiting the technical solutions of the present disclosure. Under the concept of the present disclosure, the technical features of the above embodiments or other different embodiments may be combined, the steps therein may be performed in any sequence, and various variations may be derived in different aspects of the present disclosure, which are not detailed herein for brevity of description. Although the present disclosure is described in detail with reference to the above embodiments, persons of ordinary skill in the art should understand that they may still make modifications to the technical solutions described in the above embodiments, or make equivalent replacements to some of the technical features; however, such modifications or replacements do not cause the essence of the corresponding technical solutions to depart from the spirit and scope of the technical solutions of the embodiments of the present disclosure.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A wireless charging transmitter system comprising:
   at least two transmit coils configured to simultaneously transmit power;
   at least two transmit circuits, wherein each of the at least two transmit circuits is electrically connected to a corresponding transmit coil of the at least two transmit coils, and is configured to supply a current to the corresponding transmit coil; and
   at least one decoupling circuit connected to any two coupled transmit coils of the at least two transmit coils, wherein the at least one decoupling circuit comprises a first inductor, a second inductor, a first capacitor, and a second capacitor, and wherein:
   the first inductor and the first capacitor are connected in parallel to form a first parallel circuit;
      the second inductor and the second capacitor are connected in parallel to form a second parallel circuit;
      the first inductor and the second inductor are wound about a same magnetic core or air core; and
      a first terminal of the first inductor and a first terminal or a second terminal of the second inductor are dotted terminals.

2. The system according to claim 1, wherein the any two coupled transmit coils comprise a first transmit coil and a second transmit coil, and the at least one decoupling circuit further comprises a third inductor, a fourth inductor, a third capacitor, and a fourth capacitor, and wherein:
   the third inductor are connected in parallel with the third capacitor to form a third parallel circuit;
   the fourth inductor are connected in parallel with the fourth capacitor to form a fourth parallel circuit;
   the third inductor and the fourth inductor are wound about the same magnetic core or air core with the first inductor and the second inductor;
   a first terminal of the third inductor and a first terminal or second terminal of the fourth inductor are dotted terminals;
   the first parallel circuit and the third parallel circuit are connected to two terminals of the first transmit coil respectively; and
   the second parallel circuit and the fourth parallel circuit are connected to two terminals of the second transmit coil respectively.

3. The system according to claim 1, wherein:
   the at least one decoupling circuit further comprises a fifth capacitor connected to the first parallel circuit in series, and a sixth capacitor connected to the second parallel circuit in series.

4. The system according to claim 1, further comprising:
   at least two tuning circuits configured to dynamically tune the transmit coils, wherein the at least two tuning circuits are electrically connected to the at least two transmit circuits and the at least two transmit coils respectively.

5. The system according to claim 4, wherein:
   one of the at least two tuning circuits comprises P tuning capacitors that are arranged in series, and tuning switches connected in parallel with any P−1 tuning capacitors of the P tuning capacitors respectively, and wherein:
   the tuning switches are configured to control the tuning capacitors connected in parallel with the tuning switches 0 to be in an operating state or a short-circuit state, and wherein P is an integer greater than or equal to 2.

6. The system according to claim 1, wherein:
   two inductors of the at least one decoupling circuit are coupled inductors and the two inductors are coaxial.

7. A wireless charging transmitter system comprising:
   at least two transmit coils configured to simultaneously transmit power;
   at least two transmit circuits, wherein each of the at least two transmit circuits is electrically connected to a corresponding transmitter coil of the at least two transmit coils, and is configured to supply a current to the corresponding transmit coil;
   at least one decoupling circuit connected to any two coupled transmit coils of the at least two transmit coils, wherein the at least one decoupling circuit comprises a first inductor, a second inductor, a first capacitor, a second capacitor, a first compensation circuit, and a second compensation circuit, and wherein:
   the first inductor and the first capacitor form a first parallel circuit connected in parallel with the first compensation circuit;
      the second inductor and the second capacitor form a second parallel circuit connected in parallel with the second compensation circuit;
   the first inductor and the second inductor are wound about the same magnetic core or air core; and
      a first terminal of the first inductor and a first terminal or a second terminal of the second inductor are dotted terminals, and wherein:
      the first compensation circuit comprises N groups of first series circuits, each of the N groups formed by a compensation capacitor and a switch, the N groups of first series circuits connected in parallel; and
      the second compensation circuit comprises M groups of second series circuits, each of the M groups formed by a compensation capacitor and a switch, the M groups of second series circuits connected in parallel, and wherein M and N are a positive integer, and M+N is greater than 1; and
   a control circuit electrically connected to the at least one decoupling circuit and the at the least two transmit circuits, wherein the control circuit is configured to control the N switches of the first compensation circuit and/or the M switches of the second compensation circuit to operate in an on state or an off state, such that induced circuit parameters at output terminals of the at least two transmit circuits satisfy predetermined threshold conditions.

8. The system according to claim 7, wherein:
   capacitances of the N compensation capacitors in the first compensation circuit are defined at a ratio of 2N−1; and
   capacitances of the M compensation capacitors in the second compensation circuit are defined at a ratio of 2M−1.

9. The system according to claim 7, further comprising:
at least two tuning circuits configured to dynamically tune the at least two transmit coils, wherein the at least two tuning circuits are electrically connected to the at least two transmit circuits and the at least two transmit coils respectively.

10. The system according to claim 9, wherein:
the tuning circuit comprises P tuning capacitors that are arranged in series, and tuning switches respectively connected in parallel with any P−1 tuning capacitors of the P tuning capacitors, and wherein the tuning switches are configured to control the tuning capacitors connected in parallel with the tuning switches to be in an operating state or a short-circuit state, and wherein P is an integer greater than or equal to 2.

11. The system according to claim 7, wherein:
two inductors of the at least one decoupling circuit are coupled inductors and the two inductors are coaxial.

12. A method for controlling a wireless charging transmitter system, wherein the wireless charging transmitter system comprises:
at least two transmit coils comprising a first transmit coil being connected to a first inductor and a second transmit coil being connected to a second inductor,
at least two transmit circuits comprising a first transmit circuit being electrically connected to the first transmit coil, and a second transmit circuit being electrically connected to the second transmit coil;
at least one decoupling circuit connected to any two coupled transmit coils of the at least two transmit coils, wherein the decoupling circuit comprises the first inductor, the second inductor, a first capacitor, a second capacitor, a first compensation circuit, and a second compensation circuit, and wherein:
the first inductor and the first capacitor form a first parallel circuit connected in parallel with the first compensation circuit;
the second inductor and the second capacitor form a second parallel circuit connected in parallel with the second compensation circuit;
the first inductor and the second inductor are wound about the same magnetic core or air core, and a first terminal of the first inductor and a first terminal or a second terminal of the second inductor are dotted terminals, and wherein:
the first compensation circuit comprises N groups of first series circuits, each of the N groups formed by a compensation capacitor and a switch, the N groups of first series circuits connected in parallel; and
the second compensation circuit comprises M groups of second series circuits, each of the M groups formed by a compensation capacitor and a switch, the M groups of second series circuits connected in parallel, and wherein M and N is a positive integer, and M+N is greater than 1;
the method comprising:
controlling the first transmit circuit to generate an excitation current, such that an induction magnetic field is generated by the first transmit coil;
acquiring induced circuit parameters at an output terminal of the second transmit circuit;
determining whether the induced circuit parameters satisfy predetermined threshold conditions; and
in response to determining that the induced circuit parameters do not satisfy the predetermined threshold conditions, controlling the N switches in the first compensation circuit and/or the M switches in the second compensation circuit to operate in an on state or an off state, such that the induced circuit parameters satisfy the predetermined threshold conditions.

13. The method according to claim 12, wherein the predetermined threshold conditions comprise:
an induced voltage being less than or equal to a predetermined voltage threshold; and
an induced current being less than or equal to a predetermined current threshold.

14. The method according to claim 13, wherein the wireless charging transmitter system further comprises a tuning circuit being electrically connected to the at least two transmit circuits and the at least two transmit coils.

15. The method according to claim 14, wherein the tuning circuit comprises P tuning capacitors that are arranged in series, and tuning switches respectively connected in parallel with any P−1 tuning capacitors of the P tuning capacitors, and wherein the tuning switches are configured to control the tuning capacitors connected in parallel with the tuning switches to be in an operating state or a short-circuit state, wherein P is an integer greater than or equal to 2.

16. The method according to claim 14, further comprising:
adjusting a parameter of the tuning circuit based on input impedances of equivalent loads of the transmit circuits to dynamically tune the at least two transmit coils.

17. The method according to claim 12, wherein:
capacitances of the N compensation capacitors in the first compensation circuit are defined at a ratio of 2N−1; and
capacitances of the M compensation capacitors in the second compensation circuit are defined at a ratio of 2M−1.

18. The method according to claim 12, wherein:
two inductors of the at least one decoupling circuit are coupled inductors and the two inductors are coaxial.

* * * * *